United States Patent [19]

Hollinger, Jr.

[11] 4,441,953
[45] Apr. 10, 1984

[54] HEAT SEALING MACHINE AND PROCESS FOR HEAT SEALING PLASTIC FILM EDGES

[76] Inventor: William K. Hollinger, Jr., 7015 Duncraig Ct., McLean, Va. 22101

[21] Appl. No.: 358,032

[22] Filed: Mar. 15, 1982

[51] Int. Cl.³ .............................................. B32B 31/20
[52] U.S. Cl. ...................................... 156/290; 53/479; 150/52 B; 150/52 R; 156/308.4; 156/499; 156/507; 156/583.9; 219/243; 228/59
[58] Field of Search ................. 53/479; 156/251, 290, 156/308.4, 499, 507, 515, 583.9; 219/243; 228/59; 150/52 B, 52 R

[56] References Cited

U.S. PATENT DOCUMENTS 3,413,175 11/1968 Rochla ........................... 156/499 X
3,866,648 2/1975 Anderson ....................... 206/456 X

*Primary Examiner*—Robert A. Dawson
*Attorney, Agent, or Firm*—Murray and Whisenhunt

[57] ABSTRACT

A heat sealing machine for sealing polyester sheets is disclosed, wherein edges of two polyester sheets are heat sealed together by being exposed to a nickel-chrome heating ribbon. The machine includes movable clamping bars for clamping polyester sheets to a work surface in a position to be heat sealed, and also includes a movable shield for shielding the freshly sealed plastic sheet from a heating element, as well as for providing an alignment guide for the next plastic sheet to be heat sealed on the machine, which cooperates with the clamping bar.

34 Claims, 6 Drawing Figures

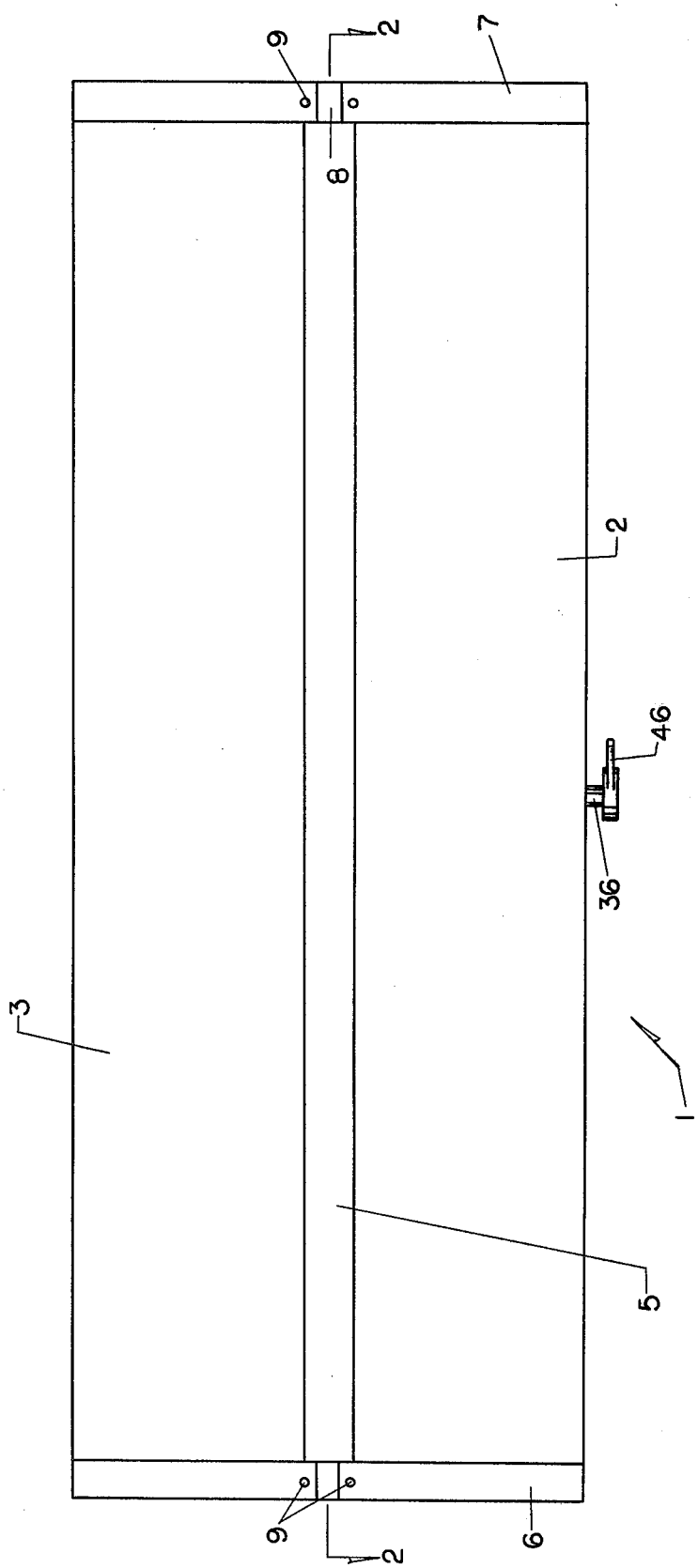

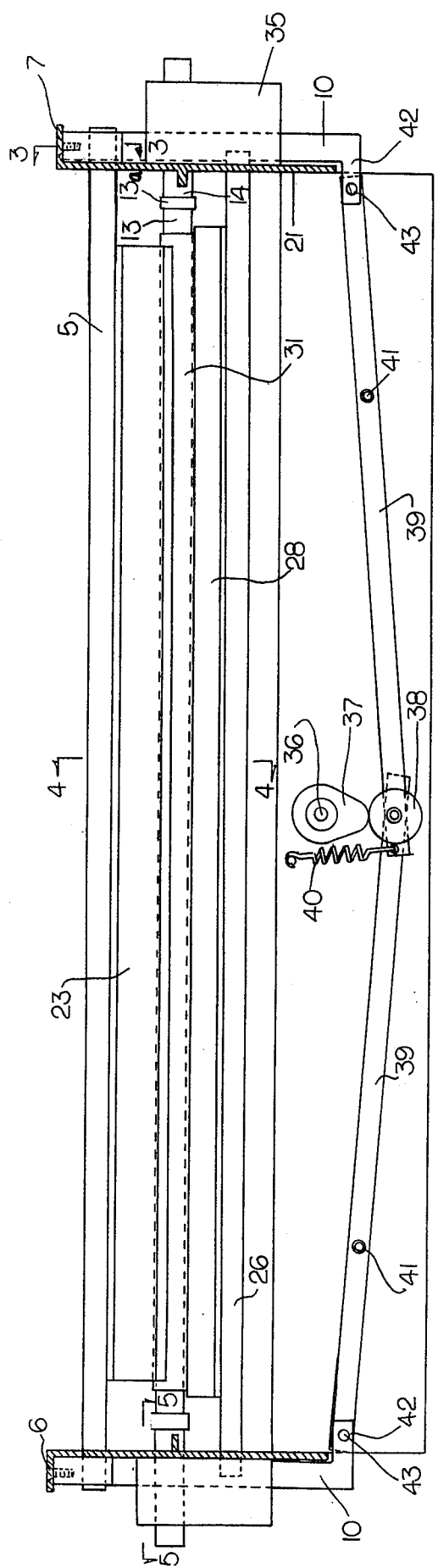
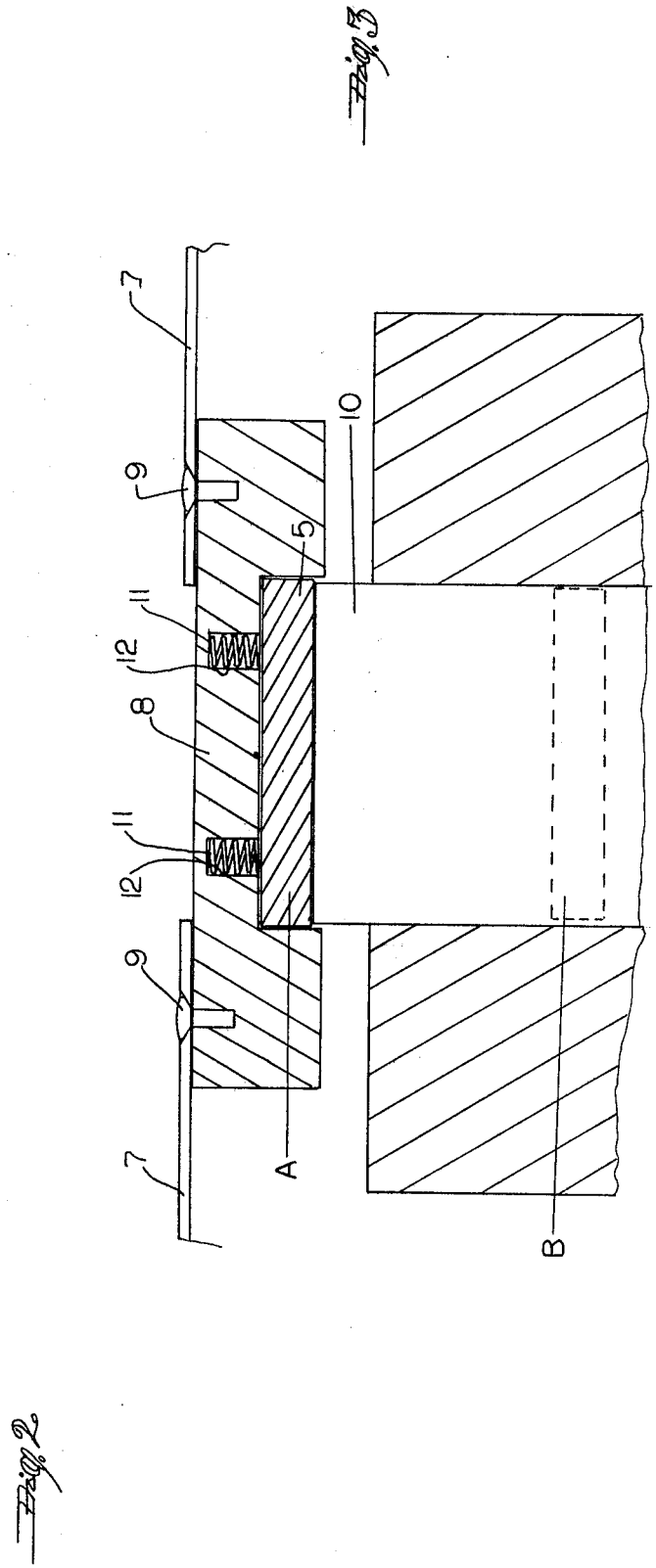

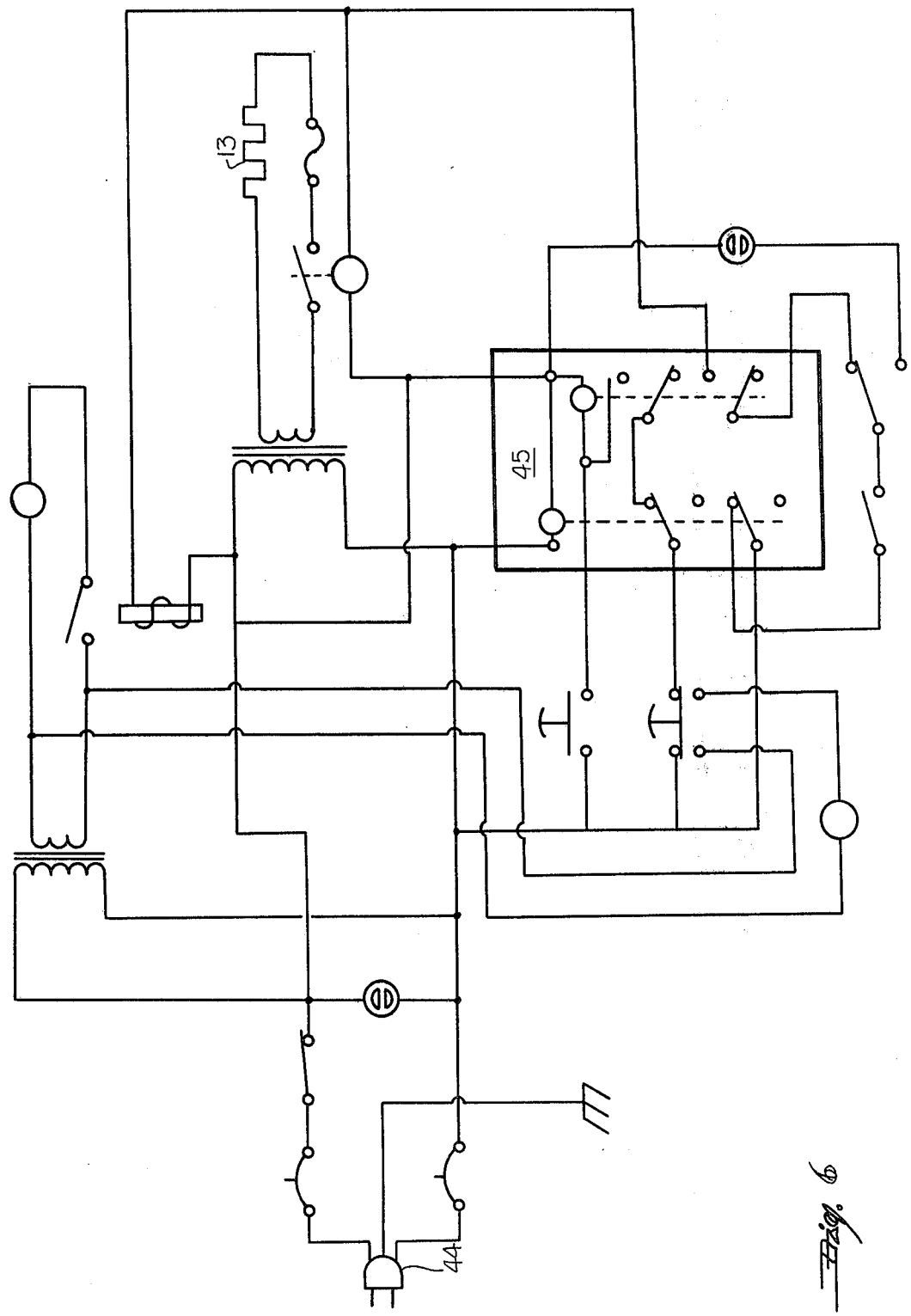

HEAT SEALING MACHINE AND PROCESS FOR HEAT SEALING PLASTIC FILM EDGES

BACKGROUND OF THE INVENTION

It is well known in the art to heat seal plastic sheets together, and especially tough, transparent plastic film sheets of polyester films. These polyester films are generally polyethylene terephthalate films, and a typical example is the polyester film known in the trade as "Mylar," a product of E. I. duPont de Nemours & Company. Note, for instance, U.S. Pat. No. 3,866,648, directed to a microfilm copy jacket made of polyester films which are held together by sealing lines formed by heat or sonic sealing to fuse the two films together at the point of contact.

One type of commercial polyester heat sealing machine utilizes a nickel-chrome heating ribbon which is maintained in a taut condition under tension. A polyester film can be abutted against the ribbon for alignment purposes, and then a clamp is lowered to clamp the polyester sheet to a work table surface for the heat sealing step. In this regard, it has generally been recognized by those in the art that poor quality seals will be obtained unless some type of clamping is utilized, when two or more polyester sheets are to be heat sealed together. As the polyester sheets are being clamped to the work table surface, the nickel-chrome ribbon heating element is moved away from the clamped polyester sheet edges which had contacted the ribbon during the alignment step mentioned above. Typically, the ribbon would be moved away from the polyester film sheet edge a distance of 1/16 to 3/16 of an inch. Then the heating cycle is initiated, and the heating ribbon heats the polyester film sheet edges to a temperature such that the films are fused together along the edge exposed to the heat sealing step. When the heat cycle is complete, the heat sealed sheets are permitted to cool somewhat in the heat sealing machine, and then the clamping pressure is released.

In such a device, when the clamping pressure is released the still-cooling nickel-chrome ribbon is moved into abutting contact with the freshly-sealed sheet edge, and if the film or the ribbon has not cooled sufficiently, the film sheet edge may tend to adhere to the ribbon, resulting in an unacceptable product. Furthermore, to aid the cooling step after the heat sealing cycle, a fan is generally in continuous operation except during the heating step, blowing room air across the location where the polyester film sheet edge is located during the heating and cooling cycles. Because of the air flow caused by the fan, however, the next, unsealed polyester film sheets may be difficult to align, with the alignment being maintained until the sheets are firmly clamped to proper position. Furthermore, with such an arrangement only one side of the nickel-chrome heating ribbon can be utilized in a given heat sealing cycle, so that the resulting production rates from such a heat sealing machine are low.

SUMMARY OF THE INVENTION

The present invention is directed to a machine for heat sealing heat-sealable, plastic films or sheets, such as polyester films, wherein both sides of a heating element can be used to heat-seal different plastic films or sheets together, and a movable shield is used to shield the freshly-sealed plastic films or sheets from the still-cooling heat-sealing element. The shield also functions as an alignment guide, with the next plastic sheet to be heat-sealed in the heat-sealing machine being aligned against such shield. A clamping device clamps the plastic films or sheets to be heat-sealed during the heat-sealing step.

In a preferred form of the invention, the heat-sealing element is located in a work table surface which extends on each side of the heat sealing element, and a shield and a clamping mechanism are provided on each side of the heat-sealing element, so that a plurality of plastic film or sheet assemblies can be subjected to the heat-sealing step at the same time, utilizing both work table surfaces on opposite sides of the heat-sealing element.

The present invention is also directed to a method of heat-sealing heat-sealable plastic films or sheets, comprising orienting the films in a heat-sealable position on a heat-sealing machine by contacting an edge of the film or sheet with a movable shield/alignment guide, to align the sheet to be heat-sealed in proper condition on the sealing machine, clamping the aligned plastic sheet, moving the shield/alignment guide out of aligning position to expose the edge of the plastic film or sheet to a heating element, and heating the heating element for a predetermined time, and thereafter moving the shield/alignment guide between the heating element and the heated edge of the plastic film or sheet to shield the freshly sealed film edge from the still-cooling heating element, disengaging the clamp from clamping engagement with the plastic sheets, and removing the heat-sealed plastic film or sheet from the machine.

BRIEF DESCRIPTION OF THE DRAWINGS

The invention will be understood more readily by reference to the accompanying drawings, wherein FIG. 1 is an overhead view of the heat-sealing machine of the present invention;

FIG. 2 is a side view, partly in cross section, of the heat sealing machine of FIG. 1, taken along line 2—2;

FIG. 3 is a cross-sectional view of the heat-sealing machine of FIG. 2, taken along line 3—3;

FIG. 6 is a wiring diagram of the heat-sealing machine of FIG. 1.

In. FIGS. 1–5, heat sealing machine 1 includes work table surfaces 2, 3, separated by a gap 4 (note Fig. 4) with clamping bar 5 overlying gap 4 along the entire length of the heat-sealing machine 1. End sections 6, 7 are at respective ends of heat-sealing machine 1 and remain in fixed relationship to work table surfaces 2,3.

Figure 5:
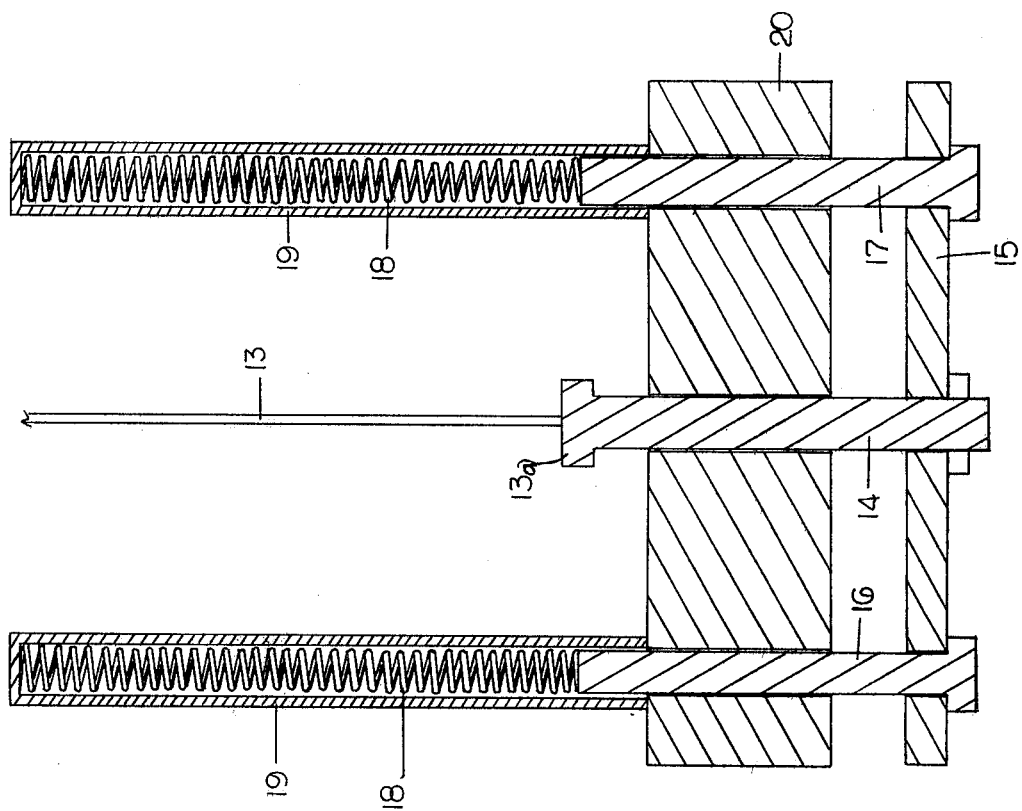
FIG. 5 is a cross-sectional view of the ribbon tensioning device of the heat-sealing machine of FIG. 2, taken along line 5—5.

As seen more clearly in FIG. 3, mounting bar 8 is attached to end section 7 by bolts 9. An end of clamp bar 5 is between mounting bar 8 and arm 10, and is biased by springs 11 located in recesses 12 of mounting bar 8 towards the upper surface of arm 10. Movement of arm 10 causes corresponding movement of clamp bar 5 from an upper position A to a lower position B (shown in dotted form). Heat sealing ribbon 13 is mounted by collar 13a to plunger 14 which is attached to plate 15. Also attached to plate 15 are two tension plungers 16, 17, and the ends of tension plungers 16, 17 remote from plate 15 are in contact with springs 18, located in housings 19, and serving to bias plate 15 away from mounting plate 20, which is firmly affixed to end plate 21 of the heat-sealing machine 1. As will be clear from consideration of FIG. 5, the action of springs 18 maintains ribbon 13 under tension, so that upon a heating cycle, when the ribbon is heated to an elevated temperature by passage of an electrical current therethrough, the ribbon can expand in length without undue warpage, and without arcing caused by contact with the edges of the work table surfaces 2, 3.

Mounting bar 5 carries clamp brackets 47, 48 mounted on the lower surface thereof by bolts 24, 25, respectively. Clamps 22, 23 are mounted on clamp brackets 47, 48 by bolts (not shown) and are held apart by spacer 49.

Shield bar 26 is located under heat sealing ribbon 13 and carries shield arms 27, 28 mounted thereon by way of bolts 29, 30, respectively. Shield 31, a trough-shaped member, is fixedly mounted to shield arms 27, 28 by way of bolt 32 and nut 33. Spacer 34 located within the trough of shield 31 serves to maintain the sides of shield 31 a fixed distance from each other.

As will be seen more clearly from FIG. 2, arm 10 is partially mounted within housing 35, and is vertically slidable therein. Rotation of shaft 36 by suitable means such as, for instance, a handle 46 extending out one side of the machine, rotates a cam 37 from a vertical position, as shown in FIG. 2, to a horizontal position approximately 90° to the configuration shown in FIG. 2. Roller follower 38 is maintained in contact with cam 37, through arms 39 and spring 40 attached to one of arms 39. Arms 39 pivot about pivot pins 41, and are connected to extensions 42 of arms 10 by way of second pivot pins 43. As shown in FIG. 2, with cam 37 in the vertical orientation, arms 10 are in the raised configuration. The upward movement of arms 10 raises clamp bar 5 and shield bar 26 attached thereto, thereby lifting clamp 22, 23 out of clamping engagement with work table surface 2, 3, respectively. The raising of shield bar 26 also raises shield arms 27, 28 and shield 31, so that shield 31 is interposed between any plastic sheets on work table surfaces 2, 3 and heat sealing ribbon 13.

When shaft 36 is rotated 90°, so that cam 37 is in the horizontal position, roller follower 38 is raised, causing rotation of arm 39 around pivot pin 41, thereby lowering pivot pin 43 and arm extension 42 and arm 40 attached thereto. This in turn lowers clamp bar 5 and shield bar 26, and clamps 22, 23 and shield 31 attached thereto. In the lowered position, clamps 22, 23 firmly clamp any plastic sheets in operable position between such clamps and work table surfaces 2, 3, respectively. At the same time, shield 31 is lowered until the top of shield 31 is below the lower edge of heat sealing ribbon 13, and the heat sealing ribbon can then be activated by passing electric current therethrough for an appropriate length of time.

A wiring diagram of the heat-sealing machine 1 is illustrated in FIG. 6. Plug 44 is inserted into an appropriate source of electrical current, and conventional 110 volt house current is appropriate. Timer 45 controls the length of time that current is passed through heat sealing ribbon 13. Typically, the heat sealing ribbon 13 will be activated for a period of time of from 2 to 10 seconds, preferably 3 to 8 seconds, and most preferably about 3½ seconds, during the heat sealing of two sheets of polyethylene terephthalate film having a thickness of 1 to 10 mils each. The heat sealing ribbon 13 should heat the exposed edges of the plastic film or sheet to a temperature of at least the welding or sealing temperature, which varies with the particular polymer, although higher temperatures, as high as e.g. 500° F. or even higher, can be tolerated, but no advantage will accrue to the use of such higher temperatures. It is necessary for the films or sheets to be heated to a temperature such that the films or sheets fuse together at their point of contact, to form a strong, durable weld or seal.

The present invention also includes a method of heat-sealing heat-sealable plastic films or sheets such as polyethylele terephthalate films or sheets. The films or sheets to be heat sealed are generally of a thickness of about 1 to about 20 mils, preferably about 2 to about 10 mils, most preferably about 3 to 4 mils in thickness. Normally, the contacting edges of the plastic films must be heated by a closely adjacent heating element at a temperature of about 450° F. for optimum sealing or welding, although broadly a temperature of at least 400° is generally operable on most polyester films. It has been found that the optimum temperature can be obtained by passing household current of 110 volts, 60 cycles per second, through a sealing machine having the wiring diagram of FIG. 6, for a time of about 3.5 seconds.

The spacing of the edges of the plastic films or sheets from the heat-sealing ribbon is quite critical, as if the edges of the plastic film are too far from the heat-sealing ribbon, then an adequate seal or weld will not be obtained. It has been found that the edge of the plastic film should be no more than 3/32 inch from the heat-sealing ribbon, preferably no more than 1/16 inch therefrom, and most preferably about 1/32–1/16 inch therefrom, and that distance, plus the width of the particular heat-sealing ribbon chosen, determines the relative dimensions of the shield/alignment guide.

While normally two or more plastic sheets or films will be sealed or welded to each other, it is possible to bend a heat-sealable film back upon itself, and then align the fold against the shield/alignment means. The aligned sheet is then clamped into position and the folded area can be exposed to the heat-sealing ribbon, to heat the fold to the welding or sealing temperature. This results in a film structure very similar to that found upon sealing or welding two separate sheets of plastic film together, with the sheet maintaining its generally folded configuration.

While household a.c. current has been found to be operable, it is clear that direct current, or higher or lower voltages than conventional 110 volt household current can be used as desired, so long as the film edges are raised to the desired temperature to form an edge seal or weld. While a cam and follower arrangement, with appropriately linking arms and pivot points, are illustrated as means to raise the clamp bar and the shield bar, other means of raising and lowering these bars could be utilized, such as, for instance, solenoids.

As the heat-sealing ribbon of the present invention is stationary in its preferred form, it is possible to utilize both sides of the ribbon to heat-seal different plastic films or sheets, so that the output from a given heat-sealing machine, having a heating element of a given length, can be double. Of course the beat sealing ribbon could be optionally movable. It has been found appropriate to use a 52 inch heat-sealing ribbon in a machine of the present development, with the total work table surface width (perpendicular to the heat-sealing ribbon) being about three feet. This width, of course, will vary depending upon the relative sizes of the plastic films or sheets to be heat-sealed.

While for many applications only two sheets of plastic film or sheet will be welded or sealed together, it should be recognized that a much greater number of plastic films or sheets can be welded or sealed together by the process of the present invention, using the apparatus of the present invention. For instance, ten pieces of 3 mil thick Mylar brand polyester film can be welded or sealed together without difficulty. Each individual sheet of polyester film can be of any thickness obtainable from the manufacturer, but for archival use, which is one of the preferred areas of application for welded or sealed polyester sheets produced according to the present invention, and on the apparatus of the present invention, the thickness of each individual film will preferably be about 2 to 4 mils, and most preferably about 3 mils.

The welding or sealing of polyester films is one of the preferred embodiments of the present invention, but it should be appreciated that other plastic films or sheets can be readily welded or sealed. For instance, Cerex brand Nylon sheets, which are spun bonded Nylon 66 sheets provided by Monsanto Company, ranging in weight from 0.3 ounce per square yard up to 2 ounces per square yard, can be readily welded or sealed by the process of the present invention, using the apparatus of the present invention. Even thicker sheets of Cerex if provided by the manufacturer could be sealed or bonded by the present invention. Furthermore, Tyvek brand spun bonded high density polyethylene sheets or Reemay brand spun bonded polyester sheets (both being products of E. I. duPont de Nemours and Co., Inc.) can also be used, in similar weights.

It is preferred that the heating element be a nickel-chrome ribbon, as illustrated in the accompanying drawings, and with this type of heating element, it requires approximately 1.5 seconds for the heating element to reach an elevated temperature of approximately 450° F., which is preferred for the welding or sealing of polyester films. Thus, it is normally necessary for current to be passed through the nickel-chrome ribbon for a minimum of 2 seconds, and preferably more than 3 seconds, in order to expose the edges of the polyester film to a sufficient temperature for a sufficient time. If a different type of heating element reached operating temperature in a shorter period of time, then it is clear that the total heating cycle could be reduced.

Figure 4:
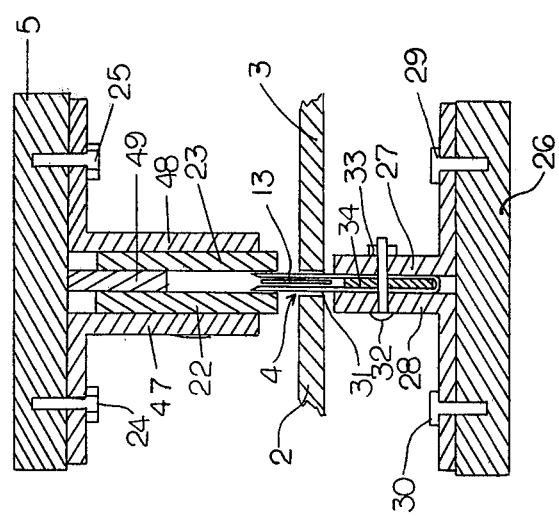
FIG. 4 is a cross-sectional view of the heat-sealing machine of FIG. 2, taken along line 4—4.

There is no maximum heat cycle time, as the length of the heat cycle will naturally vary upon the particular temperature to which the plastic film or sheet edges is exposed. The plastic film or sheet should not reach a temperature such that the sheet becomes molten and runs down the edge of the work table surface defining the gap 4 shown in FIG. 4, but so long as this excessive heating is avoided, there is no limitation as to the length of the heating cycle which can be utilized. Of course, for convenience, it is definitely preferred to have the heating cycle be as short as possible, so that production is not delayed, and normally in commercial situations the heating cycle will never be more than about 10 seconds.

As will be appreciated from consideration of the accompanying drawings and description thereof hereinabove, in the most preferred form of the present invention the shield/alignment guide and the film clamp are interconnected so that they are raised and lowered together, with the clamp being in operable position at the low point of its travel and the shield/alignment guide being in operable position at the upper point of its travel. While separate movement of the clamp and the shield/alignment guide could be possible, such separate movement is unnecessary and therefore considered undesirable.

While in many embodiments the plastic films or sheets which are edge sealed or welded are identical, the sheets or films can differ in thickness and/or weight, type of polymer, or, for instance, of sheet of spun-bonded polymeric fibers can be edge sealed or welded to a polymeric film.

Care should be taken to avoid heating the edge of the film or sheet to be sealed or welded to avoid crystallizing the polymer exposed to the sealing or welding heat, as it is desirable to avoid embrittling the polymer.

What is claimed is:

1. A heat sealing machine for simultaneously heat sealing at least two sets of plastic films or sheets, said machine comprising a work surface means for supporting said plastic sheets, an elongated heat sealing means for simultaneously heat sealing at least one set of superposed plastic films or sheets on each side thereof and projecting, at least during the heat sealing step, at least in part above said work surface means with said work surface means extending on either side of said heat sealing means, movable alignment means for providing an alignment guide for the sets of plastic sheets to be heat sealed, and movable clamping means for clamping an aligned set of said plastic sheets to said work wurface means in position on either side of said heat sealing means to be heat sealed by said heat sealing means, said clamping means and said alignment means cooperating so that at least during a portion of the time that the clamping means clamps said sets of plastic sheets, the alignment means is out of alignment relationship to the clamped plastic sheets, and at least during a portion of the time that said alignment means is in position to align each set of plastic sheets, the clamping means is out of clamping engagement with said plastic sheets.

2. Machine of claim 1, wherein said heat sealable plastic films or sheets are polyester films or sheets.

3. Machine of claim 2, wherein said heat sealing element seals a plurality of polyester sheets together.

4. Machine of claim 2, wherein said heat sealing element is an electrically heated element.

5. Machine of claim 4, wherein said electrically heated element is a nickel-chrome element.

6. Machine of claim 5, wherein said nickel-chrome element is a nickel-chrome heating ribbon.

7. Machine of claim 6, wherein said machine includes two shield/alignment means, with one shield/alignment means on each side of said ribbon.

8. Machine of claim 7, wherein said machine includes two clamping means, one in association with each shield/alignment means.

9. A method of simultaneously heat sealing at least two sets of plastic films or sheets, said method comprising aligning each set of said films or sheets in proper positions on a heat-sealing machine by contacting the edge of each set of the films or sheets with a movable alignment means with at least one set of films or sheets on each side of the alignment means, clamping said aligned sets of plastic film or sheet and moving the alignment means out of aligning position, exposing the aligned edges of the plastic film or sheet to heat from an elongated heating element positioned between at least two sets of the aligned plastic sheets for a predetermined time to weld or seal the plastic films or sheets edges, thereafter terminating transfer of heat from the heating element to the edges and disengaging the plastic film or sheet from clamping engagement.

10. Method of claim 9, wherein the plastic film or sheet is heated to a temperature of at least about 400° F.

11. Method of claim 10, wherein said plastic film or sheet is a polyester film.

12. Method of claim 10, wherein said plastic film or sheet is a Nylon sheet.

13. Method of claim 10, wherein the edge of the plastic film or sheet to be welded or sealed is located no more than 3/32 of an inch from the heating element.

14. Method of claim 13, wherein said distance is no more than about 1/16 of an inch.

15. Method of claim 10, wherein each plastic film or sheet is about 1 to about 10 mils thick.

16. A method of welding or heat sealing at least two different sets of polyester film assemblies, said method comprising placing an assembly of superposed polyester films having a thickness of about 1 to about 10 mils in proper position on a heat sealing machine by contacting an edge of each assembly of polyester films to be sealed or welded against a movable shield/alignment guide to align the polyester film assembly in proper condition for a subsequent heat sealing step, with at least one polyester film assembly being on each side of the shield/alignment guide, thereafter clamping the aligned sets of polyester film assembly to prevent movement thereof and to cause the superposed films to contact adjacent films along said edge thereof, moving the shield/alignment guide out of aligning position, heating the said edges by exposing said edges to heat from an elongated heating element positioned between at least two of the sets of the polyester film assemblies for a time and temperature sufficient to weld or seal the polyester film assembly at the edges thereof without substantial flow of thee polyester film due to melting thereof, thereafter moving the shield/alignment guide between the heating element and the freshly welded or sealed edges of the polyester film assemblies to shield the freshly sealed or welded edges from the heating element, and unclamping the polyester film assemblies.

17. A method of heat sealing at least two sets of plastic films or sheets at the same time, said method comprising placing said two sets of said films or sheets on a work table having an elongated heating element associated therewith, with at least one set of said films or sheets on each side of the heating element, aligning the sets of films or sheets in proper position on said work table by contacting an edge of each set of films or sheets with a movable shield/alignment means to align each set to be heat sealed in proper position on said table, clamping the aligned sets of films or sheets on said table, moving the shield/alignment means out of aligning position to expose the edge of each set of plastic films or sheets to heat from said heating element for a predetermined time to weld or seal the plastic films or sheets edges so exposed, thereafter moving said shield/alignment means between the heating element and the welded or sealed edges of the plastic films or sheets to shield the welded or sealed edges from the heating element, and disengaging the sets of films or sheets from clamping engagement.

18. A method of welding or heat sealing polyester films together, said method comprising placing a plurality of polyester film sets, each set including a plurality of superposed polyester films having a thickness of about 1 to about 10 mils, on a work table having a ribbon heating element associated therewith, with at least one set of said films on each side of said heating element ribbon, aligning the sets of films on said table by contacting the edge of each set of superposed films to be sealed or welded against a movable shield/alignment guide to align each set of films in proper condition on the table, thereafter clamping the aligned sets of films to prevent movement thereof and to cause the superposed films to contact the adjacent films along at least one edge thereof while moving the shield/alignment guide out of aligning position, heating the edge of each set of polyester films by exposing said edges to heat from the ribbon heating element for a time and temperature sufficient to weld or seal the polyester film edges together with substantial flow of the film due to melting thereof, thereafter moving the shield/alignment guide between the heating element and the welded or sealed edge of the polyester film sets to shield the sealed or welded edge from the heating element while unclamping the polyester film from said table.

19. A heat sealing machine for sealing heat-sealable plastic films or sheets, said machine comprising a work surface means for supporting said plastic sheet, a stationary heat sealing element projecting, at least during the heat sealing step, at least in part above said work surface and in stationary relationship thereto, movable clamping means for clamping said plastic sheet to said work surface means in position to be heat sealed by said sealing element, and movable shield/alignment means for shielding the heat sealed plastic sheet from said heating element and for providing an alignment guide for the next plastic sheet to be heat sealed, said clamping means and said shield/alignment means being interconnected and cooperating so that during the time that the clamping means clamps said plastic sheets, the shield/alignment means is out of shielding position between the clamped plastic sheet and said heating element, and during the time that said shield/alignment means is between the heating element and the plastic sheet, or the location where the plastic sheet will be placed, the clamping means is out of clamping engagement with said plastic sheet or said location.

20. Machine of claim 19, wherein said heat sealable plastic films or sheets are polyester films or sheets.

21. Machine of claim 20, wherein said heat sealing element seals a plurality of polyester sheets together.

22. Machine of claim 20, wherein said heat sealing element is an electrically heated element.

23. Machine of claim 22, wherein said electrically heated element is a nickel-chrome element.

24. Machine of claim 23, wherein said nickel-chrome element is a nickel-chrome heating ribbon.

25. Machine of claim 24, wherein said machine includes two shield/alignment means, with one shield/alignment means on each side of said ribbon.

26. Machine of claim 25, wherein said machine includies two clamping means, one in association with each shield/alignment means.

27. A method of heat sealing plastic films or sheets, said method comprising placing said films or sheets in proper position on a heat-sealing machine by contacting the edge of the films or sheets with a movable shield/alinment means, thereby aligning the film or sheet to be heat sealed in proper position on the heat-sealing machine, clamping said aligned plastic film or sheet and simultaneously moving the shield/alignment means out of aligning position, exposing the edge of the plastic film or sheet to heat from a stationary heating element for a predetermined time to weld or seal the plastic film or sheet edge, thereafter moving said shield/alignment means between the heating element and the heated edge from the heating element and simultaneously disengaging the plastic film or sheet from clamping engagement by the said machine.

28. Method of claim 27, wherein the plastic film or sheet is heated to a temperature of at least about 400° F.

29. Method of claim 28, wherein said plastic film or sheet is a polyester film.

30. Method of claim 28, wherein said plastic film or sheet is a Nylon sheet.

31. Method of claim 28, wherein the edge of the plastic film or sheet to be welded or sealed is located no more than 3/32 of an inch from the heating element.

32. Method of claim 31, wherein said distance is no more than about 1/16 of an inch.

33. Method of claim 28, wherein each plastic film or sheet is about 1 to about 10 mils thick.

34. A method of welding or heat sealing polyester films together along an edge thereof, said method comprising placing a plurality of superposed polyester films having a thickness of about 1 to about 10 mils a distance which is no more than 3/32 of an inch from the elongated heating element of a heat sealing machine and in aligned position thereon by contacting the edge of the superposed polyester films to be welded or sealed against a movable shield/alignment guide to align the superposed films in position, thereafter clamping the aligned polyester films to prevent movement thereof and to cause the superposed films to contact adjacent films along said edge, while simultaneously moving the shield/alignment guide out of aligning position, heating the said edge to a temperature of at least about 400° F. by exposing said edge to heat from said heating element for a time sufficient to weld or seal the polyester film edges together without substantial flow of the film due to melting thereof, thereafter moving the shield/alignment guide between the heating element and the freshly welded or sealed edge to shield the edge from the heating element, while simultaneously unclamping the polyester film from the heat sealing machine, and permitting the freshly welded or sealed edge to cool under ambient conditions.

* * * * *